Figure 1:
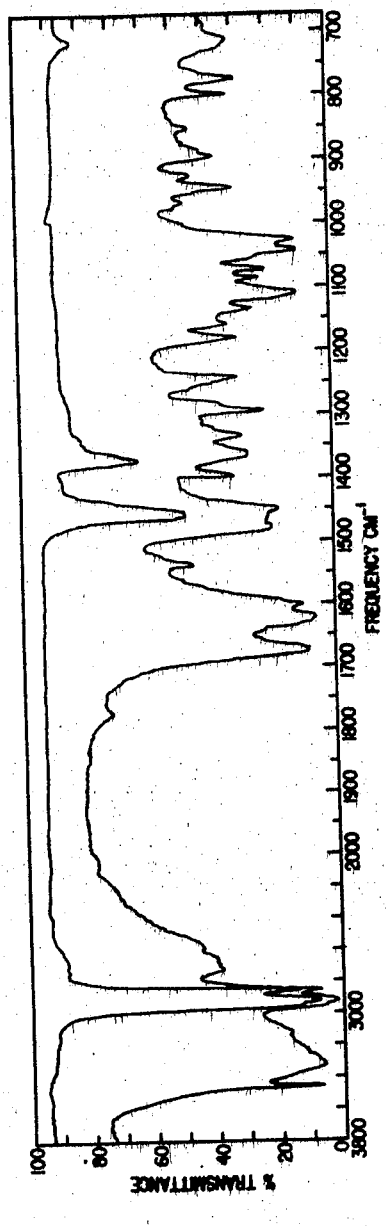

FIGURE 1. INFRARED ABSORPTION SPECTRUM – CANARIUS

PROTON MAGNETIC RESONANCE SPECTRUM—CANARIUS

United States Patent Office 3,183,156
Patented May 11, 1965

3,183,156
ANTIBIOTIC CANARIUS AND METHOD
OF PRODUCTION
James Joseph Vavra and Malcolm E. Bergy, Kalamazoo, Mich., assignors to The Upjohn Company, Kalamazoo, Mich., a corporation of Delaware
Filed May 25, 1962, Ser. No. 197,637
7 Claims. (Cl. 167—65)

This invention relates to a novel composition of matter and to a process for the production thereof. More particularly, this invention relates to a new compound, canarius, and to a process for the production thereof.

Canarius is a biosynthetic product obtained as an elaboration product of a canarius-producing actinomycete. It has the property of adversely affecting the growth of various microorganisms, particularly viruses, for example vaccinia, Newcastle disease, influenza A and Coe viruses, and various yeasts, for example, *Saccharomyces carlsbergensis* and *Saccharomyces cerevisiae*. The new compound can be used alone or in combination with other antimicrobial agents to prevent the growth of or to reduce the number of microorganisms present in various environments. For example, it is useful in the sterilization of beer and ale after fermentation by inhibition of ale yeast and the "bottom yeast" *Saccharomyces carlsbergensis*, or prevention of contamination of other fermentations by these yeasts; and it is useful in lowering or eliminating virus contaminations in tissue culture cells. It can also be used as a rodenticide.

THE MICROORGANISM

The actinomycete used according to this invention for the production of canarius has been designated as *Streptomyces canarius* var. *canarius*. One of its strain characteristics is the production of canarius. A subculture of this variety can be obtained from the permanent collection of the Northern Utilization and Research Division, Agricultural Research Service, U.S. Department of Agriculture, Peoria, Illinois, U.S.A. Its accession number in this repository is NRRL 2976.

It is to be understood that the invention is not limited to the use of the particular organism described herein, but includes, inter alia, mutants produced from the described organism by mutating agents, for example, X-rays, ultraviolet radiation and nitrogen mustards.

Macroscopic and microscopic observations on *Streptomyces canarius* v. *canarius* are given in the following tables:

Table I—Appearance on Ektachrome
Table II—Assimilation of carbon compounds in a synthetic medium
Table III—Cultural characteristics
Table IV—Microscopic characteristics

*Table I.—Appearance of S. Canarius v. canarius on Ektachrome* *

| Agar medium | Surface | Reverse |
|---|---|---|
| Bennett's | Pale gray pink | Yellow. |
| Czapek's | ----do---- | Bright yellow. |
| Maltose tryptone | ----do---- | Yellow. |
| Peptone-iron | Colorless | Yellow tan. |
| 0.1% tyrosine | Pale gray pink | Red tan. |
| Case in starch | ----do---- | Colorless. |

*Dietz, A., "Ektachrome Transparencies as Aids in Actinomycete Classification," Annals of the N.Y. Academy of Sciences, 60: 152–154, 1954.

*Table II.—Assimilation of carbon compounds in a synthetic medium* * *by S. canarius v. canarius*

| | | |
|---|---|---|
| D-xylose + | Cellobiose + | Salicin (+) |
| L-arabinose + | Raffinose + | Na formate (−) |
| Rhamnose + | Dextrin + | Na oxalate (−) |
| D-fructose + | Inulin (+) | Na tartrate (−) |
| D-galactose + | Soluble starch + | Na salicylate − |
| D-glucose + | Glycerol + | Na acetate (+) |
| D-mannose + | Ducitol (−) | Na citrate (+) |
| Maltose + | D-mannitol + | Na succinate (+) |
| Sucrose + | D-sorbitol (+) | Control (−) |
| Lactose + | Inositol + | |

*Pridham, T. G., and Gottlieb, D., "Assimilation of Carbon Compounds in Synthetic Medium," J. Bact., 56: 107–114, 1948.
+ =Positive assimilation.
(+)=Slight growth—positive assimilation.
(−)=Slight growth—no assimilation.
− =No growth.

*Table III.—Cultural characteristics of S. canarius v. canarius*

| Medium | Aerial growth | Vegetative growth | Other |
|---|---|---|---|
| Plain gelatin | | Colorless | Yellow pigment. Partial liquefaction. |
| Synthetic nitrate broth. | | Colorless to yellow. | None to yellow pigment. Reduction in 4 out of 5 tubes. |
| Peptone-iron agar | Slight, white | Yellow | No H₂S darkening. |
| Calcium malate agar. | Slight, white to gray. | Colorless to yellow. | Malate solubiliized around growth. |
| Glucose asparagine agar. | Trace, cream white to gray. | Yellow | |
| Skim milk agar | Very slight trace gray. | Colorless to yellow. | Yellow pigment. Casein solubilized. |
| Xanthine agar | Slight cream to white. | Colorless to cream. | Trace yellow pigment. Xanthine solubilized. |
| Tyrosine agar | Pale gray-white to gray-pink. | Yellow | Yellow pigment. Tyrosine not solubilized. |
| Bennett's agar | Gray white | ----do---- | Yellow pigment. Growth at 18° superior to that at 24°, 28°, 37°. No growth at 55°. |
| Czapek's sucrose agar. | ----do---- | ----do---- | No pigment to bright yellow pigment. Growth at 18° and 24° superior to that at 28°. |
| Maltose tryptone agar. | White to gray-white. | ----do---- | Yellow pigment. |

The colors of *S. canarius* v. *canarius* on Bennett's and Szapek's sucrose agars correspond to the following color chips in the Color Harmony Manual, Jacobson, R., et al., 3rd edition, 1948.

Surface—2cb; Ivory tint
Reverse—
 1½ gc: Dusty yellow
 2 me: Mustard gold, old gold
Pigment—Same as reverse

*Table IV.—Microscopic characteristics of S. canarius v. canarius*

Light microscope _____ Coremia present. Spore structures flexuous to open loops to spirals.
Electron microscope:
    Touch preparation _ Spore surface smooth, but slightly irregular. Spores distinct, slightly oval with ends appressed.
    Carbon repligraph __ Spore surface has fine detail of basket weave type. Spores appressed.

The new compound of the invention is produced when the elaborating organism is grown in an aqueous nutrient medium under submerged aerobic conditions. It is to be understood that for the preparation of limited amounts surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed brewer's yeast with milk solids, soybean meal, cottonseed meal, corn meal, milk solids, pancreatic digest of casein, distillers' solubles, animal peptone liquors, meal and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conducive to satisfactory growth of the microorganism, for example, between about 18° and 40° C. and preferably between about 26° and 30° C. Ordinarily, optimum production of the compound is obtained in from about 2 to 10 days. The medium normally stays fairly close to neutral, or on the alkaline side, during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The new compound of the invention has the empirical formula $C_{13}H_{21}N_7O_8$. It is soluble in water, dimethyl sulfoxide, and glacial acetic acid. Canarius is relatively insoluble in organic solvents, for example, butanol and higher alcohols and ethers.

In accordance with a preferred procedure for the recovery of the new compound of the invention, canarius, the whole beer is adjusted, if necessary, to a near neutral pH or below, suitably between pH 2 and pH 8 and filtered. A filter aid, for example, diatomite can be used. The clear beer is then percolated over a surface active absorbent, for example, decolorizing carbon or decolorizing resin, from which the absorbed material is eluted with a solvent, for example, acidified aqueous acetone. Suitable decolorizing resins e.g., Permutit DR, are described in U.S. Patent 2,702,263.

The material in the eluate is subjected to liquid-liquid extraction processes, first to partition chromatography and then to countercurrent distribution using the following solvent systems:

Partition column:
    Ethyl acetate: 1-butanol:McIlvaine's pH 6.0 buffer (6:4:3)
    Ethyl acetate: McIlvaine's pH 6.0 buffer (1:1)
Countercurrent distribution:
    1-butanol:water (1:1)
    2-butanol:water (1:1)

Carnarius is active against yeast as shown in Table 1.

*Table 1.—Yeast inhibition by canarius*

| Yeast | Conc. of canarius (mcg./ml.) | Zone of inhibition (mm.) |
|---|---|---|
| *Saccharomyces cerevisiae*, NRRL-Y-628 (ale yeast). | 1,000 | 22.5 |
|  | 500 | 17.75 |
|  | 250 | 15.0 |
|  | 125 | 0 |
| *Saccharomyces carlsbergensis* | 1,000 | 22.0 |
|  | 500 | 18.25 |
|  | 250 | 14.50 |
|  | 125 | 0 |

The novel compound of the invention, canarius, is useful in controlling the growth of the above yeasts in many environments. For example, canarius can be used to sterilize beer after fermentation by inhibition of the "bottom yeast," *Saccharomyces carlsbergensis*.

The new compound of the invention, canarius, is essentially non-toxic to non-growing cells in antiviral tissue culture assay. It is toxic to growing KB cells. Canarius in the tube dilution tissue culture assay[1] demonstrates an activity of 12.5 KBU/mg. In the disc plate antitumor assay,[2] a 21 mm. zone is obtained at a 200 mcg./ml. dose.

In mice, an intraperitoneal dose of 14 mg./kg. of canarius killed fifty percent of the animals. In rats, an oral dose of 79 mg./kg. of canarius killed fifty percent. Canarius has been shown to be a rather unique hepatotoxic agent. In three species (mouse, dog, and cynomolgus monkeys) it produced fatty degeneration in nearly every hepatic cell at relatively low parenteral doses.

Canarius is active in vitro against the parasite *E. histolytica* at a dose of 200 mcg./ml.

The following examples are illustrative of the process and products of the present invention, but are not to be construed as limiting. All percentages are by weight and all solvent mixture proportions are by volume unless otherwise noted.

---

[1] This tissue culture assay is a meaurse of the inhibition of protein synthesis in a tissue culture using KB cells.

$$\text{KBU/unit of material (mg. or ml.)} = \frac{\text{that dilution of 1 unit of material which effects a 50\% inhibition of protein synthesis}}{1000}$$

[2] Paper discs (12.5 mm.), saturated with the solution to be tested, were placed on trays containing 4×10⁵ Eagle's KB epidermoid carcinoma cells per ml. of modified Miyamura agar (see Grady, J. E., Lummis, W. L., and Smith, C. G., Proc. Soc. Exptl. Biol. and Med., 103:727, 1960). The trays were incubated at 37° for 16 hours and zones of activities on the trays were detected by spraying the agar with a 0.4 percent solution of 2,6-dichlorophenol-indophenol in methanol-saline (1:9 by volume). After one hour, during which time the unaffected cells reduced the blue dye, the zones of activity appeared dark blue against a colorless or light blue background.

EXAMPLE 1

(A) *Fermentation.*—A soil stock of *Streptomyces canarius* var. *canarius*, NRRL 2976, was used to inoculate a series of 500 ml. Erlenmeyer flasks, each containing 100 ml. of sterile preseed medium (GS–7) consisting of the following ingredients:

| | |
|---|---|
| Glucose monohydrate | gms__ 25 |
| Pharmamedia [1] | gms__ 25 |
| Tap water, q.s. | liters__ 1 |

[1] Pharmamedia is an industrial grade of cottonseed flour produced by Traders Oil Mill Co., Fort Worth, Tex.

The flasks were incubated at 28° C. for 48 hours on a Gump rotary shaker operating at 260 r.p.m. The pH at harvest was 5.0.

Six shake flasks of the seed described above (600 ml.) were used to inoculate a 380 liter seed tank containing 250 liters of sterile seed medium (V–2) consisting of the following ingredients:

| | |
|---|---|
| Glucose monohydrate | g./liter__ 10 |
| Corn steep liquor | do____ 10 |
| Pharmamedia | do____ 2 |
| Wilson's Peptone Liquor No. 159 [1] | do____ 10 |
| Lard oil | ml./liter__ 2 |
| Tap water | Balance |

[1] Wilson's Peptone Liquor No. 159 is a preparation of hydrolyzed proteins of animal origin.

The seed medium presterilzation pH was 7.2. The seed tank was grown for 26 hours at a temperature of 28° C., with aeration at a rate of 100 standard liters/min., and agitation at a rate of 280 r.p.m.

Twelve and one-half liters of the seed medium, described above, was then used to inoculate a 380-liter fermentor containing 250 liters of the following sterile medium:

| | |
|---|---|
| Glucose monohydrate | g./liter__ 20 |
| Pabst brewer's yeast | do____ 2.5 |
| Soybean flour | do____ 10 |
| Ammonium sulfate | do____ 5 |
| Sodium chloride | do____ 3 |
| Calcium carbonate | do____ 4 |
| Lard oil | ml./liter__ 2 |
| Tap water | Balance |

The fermentor medium presterilization pH was 6.5. The fermentation then proceeded for 112 hours during which time the temperature was controlled at 28° C., filtered air was supplied at a rate of 100 standard liter/minute, and agitation was at the rate of 280 r.p.m. During the course of the fermentation, 3500 ml. of lard oil was added as an antifoam agent. At 112 hours, the above fermentation assayed 61.5 mcg./ml. of canarius on a quantitative assay.[3] Average dry solids of the canarius fermentation beer assayed approximately 20–50 mg./ml.

The above described fermentation was scaled up to an 8000 liter capacity fermentor, and this fermentation was then processed in the following manner.

(B) *Recovery.*—The whole beer (4900) liters from the 8000 liter capcaity fermentor, referred to above, was filtered using 2.5 percent diatomaceous earth as filter aid. The filter cake was washed with one-fifth volume (ca. 900 liters) of water and the wash was added to the clear beer. The clear beer was then percolated through a resin column. The column consisted of seven cubic feet of Permutit DR resin (a porous anionic decolorizing polymer with weak anionic exchange properties for strong acids; see U.S. Patent 2,702,263, column 2, lines 62 to 73) which had been treated with aqueous NaOH followed by a water rinse, and placed in a twelve inch I.D. stainless steel tube. Percolation through this column was over a ten hour period at a rate that varied between six to thirty liters/minute and at 30 to 45 pounds pressure. The spent beer pH was 11.9 at the beginning of the percolation period, and 6.3 at the end. The column was washed with 400 liters of water at pH 7.4. The resin was then eluted with 100 liters of 5 percent acetone in water which was acidified to pH 4.5 with 2.2 liters of concentrated hydrochloric acid. The resin was again eluted with 910 liters of 5 percent acetone in water at pH 4.5. Each aqueous acetone eluate was then concentrated to an aqueous solution, adjusted to pH 7.0 and freeze dried; the first gave 286 gm. of canarius (preparation WMH–111D) and the second gave 1667 gm. of canarius (preparation WMH–111E).

A portion of preparation WMH–111E (858 gm.) was used as feed for a partition column which was prepared as follows:

A solvent system consisting of 606 liters of ethyl acetate, 404 liters of 1-butanol, and 303 liters of McIlvaine's pH 6.0 buffer was thoroughly mixed and equilibrated. The two phases were separated for individual use. Twenty-two kilograms of diatomaceous earth filter aid was slurried in 147 liters of upper phase of the previously described system. To this slurry was added 8.83 liters of lower phase and the mixture was homogenized. This mixture was pumped into a 14 inch column and packed with 3 p.s.i. pressure of an inert gas. A layer of sea sand was added to the top of the bed.

Eight hundred and fifty-eight grams of feed (WMH–111E) was dissolved in 920 ml. of lower phase and 6.13 liters of upper phase. (Solvent system for feed was 7 liters of ethyl acetate and 7 liters of McIlvaine's buffer pH 6.0.) The feed and solvent mixture was homogenized with 1840 grams of standard grade Super-Cel (diatomaceous earth filter aid), and gently added to the top of the column bed. The column was developed with the upper phase of the system ethyl acetate, 1-butanol, and buffer as described above. The column holdup volume was 90 liters and the column flow rate was 1500 ml./minute. A total of eleven fractions was collected; the first fraction was a double holdup volume (180 liters), fractions two through ten each consisted of a liquid holdup volume of 90 liters, and fraction eleven consisted of 60 liters. Each of the fractions was concentrated under reduced pressure at <50° C. to a solid and/or an oil. The profile of the solids contained in the above described fractions is shown in the following table.

| Fraction | Solids (mg./ml.) | Total (grams) |
|---|---|---|
| 1 | 0.93 | 167.4 |
| 2 | 0.4 | 36.0 |
| 3 | 0.24 | 21.6 |
| 4 | 0.17 | 15.3 |
| 5 | 0.12 | 10.8 |
| 6 | 0.1 | 9.0 |
| 7 | 0.13 | 11.7 |
| 8 | 0.08 | 7.2 |
| 9 | 0.12 | 10.8 |
| 10 | 0.12 | 10.8 |
| 11 | 0.11 | 6.6 |
| Total | | 307.2 |

Fractions 3 through 10 from the above described column were combined and shaken in a heated system of 300 ml. of 1-butanol:300 ml. of water. After equilibration the phases were separated. Crystalline material was present in both the 1-butanol phase and the aqueous phase. The phases were separated, and the crystals were filtered, washed with the solvent from which they sepa-

---

[3] Plaque suppression tissue culture assay. See: Siminoff, P., "A Plaque Suppression Method for the Study of Antiviral Compounds," Applied Microbiology, 9: 66–72, 1961.

rated, and dried in vacuo, to yield the following four crystalline and liquid canarius preparations:

(1) Preparation 1:
   Crystals from aqueous phase—
      Dry wt.=2.8 grams.
      U.V. (water) at m$\mu$ 266, a=28
      U.V. (MeOH) at m$\mu$ 266, a=27
(2) Preparation 2:
   Filtrate from preparation 1 plus washes—
      Volume=620 ml. pH 5.9.
      Total solids=53.48 grams.
      U.V. (MeOH) at m$\mu$ 265, a=41.
(3) Preparation 3:
   Crystals from 1-butanol phase—
      Dry wt.=4.4 grams.
      U.V. (MeOH) at m$\mu$ 265, a=48.
(4) Preparation 4:
   Filtrate from preparation 3 plus washes—
      Volume=460 ml.
      Total solids=9.2 grams.
      No. U.V. max. at m$\mu$ 265.

(This preparation was discarded.)

(C) *Purification.*—Preparation 1, described above, was stirred in 75 ml. of water at approximately 90° C. until solution of the crystalline material was complete. A water-insoluble, amorphous-appearing material which remained was filtered and discarded. The clear filtrate was concentrated in vacuo at approximately 50° C. to a volume of 20 ml. Crystallization began soon after the concentration was started. The solution was then chilled to 5° C. overnight. The crystals were removed by filtration, washed with 10 ml. of water followed by 20 ml. of acetone, and dried in vacuum to a constant weight at room temperature. The dried canarius crystals (MEB-76) weighed 2.14 grams and had a U.V. maxima (in water) at 265 m$\mu$, a=47.

The aqueous solution and washes (preparation 2, volume 620 ml.), described above, was concentrated to 350 ml. and mixed with 350 ml. of 2-butanol. Ten ml. of each phase was placed in each of 35 tubes in the Craig countercurrent distribution apparatus (CCD), and distributed for 229 transfers. Tubes 42 through 66 contained crystalline material. Each tube was analyzed by U.V. and fractions 42–102 showed U.V. absorption at 265 m$\mu$. The contents of tubes 42 to 102 inclusive were removed and the crystals (preparation MEB-A) were separated from the liquid phase (preparation MEB-B) by filtration. The tubes were rinsed with hot water to remove crystals clinging to the walls. Preparation MEB-A was dissolved in the hot rinse water, and the resulting solution was filtered, concentrated in vacuo to 20 ml., and cooled to 5° C. The canarius crystals were removed by filtration, washed with water followed by acetone, and dried in vacuo at room temperature to a constant weight of 3.12 g. (preparation MEB-79). This preparation exhibited ultraviolet maximum absorption in water at 265 m$\mu$, a=46. Liquid phase preparation MEB-B described above was concentrated in vacuo to 40 ml. and held at 5° C. overnight. The canarius crystals were removed by filtration, washed with water followed by acetone and dried in vacuo to a constant weight of 10.0 grams (preparation MEB-78). This preparation exhibited ultraviolet maximum absorption in water at 266 m$\mu$, a=45.

The crystals from the 1-butanol phase (preparation 3, 4.4 grams) described above, were slurried for five minutes in 150 ml. of water at 90° C. and filtered hot. An insoluble material, weighing 1.59 grams, was discarded. The clear filtrate was concentrated in vacuo at <50° C. to volume of 30 ml. Crystallization began soon after the concentration was started. The mixture was held at 5° C. overnight. The crystals were removed by filtration, washed with 10 ml. of water followed by 20 ml. of acetone and vacuum dried at room temperature to a constant weight of 2.6 grams of canarius (preparation MEB-77). This preparation had a U.V. absorption maxima in water at 266 m$\mu$, a=39.

(D) *Recrystallization.*—Crystalline preparations MEB-76, MEB-77, and MEB-78, were pooled (14.6 grams) and slurried in 800 ml. of water at 95° C. for 30 minutes and filtered. The filtrate was held at 5° C. for twelve hours at which time crystallization commenced. The crystals were collected by filtration and washed with 50 ml. of water followed by 50 ml. of acetone. The crystals were vacuum dried to a constant weight at room temperature giving 11.17 grams (preparation MEB-83) which had a U.V. absorption maximum in water at 265 m$\mu$, a=44.6.

Crystalline preparation MEB-83 (11.17 grams) and 2 grams of crystalline preparation MEB-79 were pooled and slurried for about three minutes in 1300 ml. of water heated to 100° C. The solution was filtered hot through a sintered glass funnel and cooled immediately to 50° C. The solution was further cooled to 5° C. and allowed to stand overnight at this temperature. The resulting crystals were removed by filtration, washed with 25 ml. of water followed by 50 ml. of acetone, and then vacuum dried to a constant weight at room temperature giving 10.62 grams (preparation MEB-84) which had a U.V. absorption maxima in water at 265 m$\mu$, a=47.6.

(E) *Craig countercurrent distribution of crystals.*—Two hundred milligrams of crystalline preparation MEB-84 was suspended for 2 hours in a warm mixture composed of 90 ml. of each phase of a system consisting of 2-butanol:water (1:1). Insoluble crystals were removed by filtration and the clarified filtrate was placed in tubes 0–40 of the Craig countercurrent apparatus and distributed for 1,000 transfers. Tubes 350 to 400, inclusive, were pooled, filtered, and concentrated to an aqueous volume of 5 ml. The solution was allowed to crystallize overnight at 5° C. The crystals were filtered and washed with 2 ml. of water followed by 5 ml. of "Analytical Reagent Grade" acetone. The crystals were then vacuum dried to a constant weight at room temperature to give 82 mg. of canarius (preparation MEB-91).

CHEMICAL AND PHYSICAL PROPERTIES
OF CANARIUS

Crystalline canarius had the following physical and chemical properties:

Color: White
Melting point: Indefinite, >180° C.
Elementary analysis:
   C=38.40%
   H=4.94%
   N=24.05%
   O=31.85%

Empirical formula: $C_{13}H_{21}N_7O_8$
Specific optical rotation:

$$[\alpha]_D^{25} = +55.4 \text{ (c.}=0.09\% \text{ in water)}$$

Solubility:
   Soluble—
      Water, approximately 1.0 mg./ml.
      Dimethyl sulfoxide, >100 mg./ml.
      Glacial acetic acid
   Insoluble—
      Acetone
      1-butanol and higher alcohols
      Cyclohexane
      Ethers Ultraviolet spectrum: The ultraviolet absorption maxima of crystalline canarius, as reproduced in FIGURES 2 and 3 of the drawing, are:

Water—Max. at 264.5 m$\mu$, a=49.79
0.01 N $H_2SO_4$—Max. at 272 m$\mu$, a=50.34
0.01 N NaOH—Max. at 271.5 m$\mu$, a=45.36

Infrared spectrum: The infrared absorption spectrum of canarius suspended in Nujol mull is reproduced in FIGURE 1 of the drawing. Canarius shows peaks at the following wave lengths expressed in reciprocal centimeters:

| | | |
|---|---|---|
| 3460 (S)[1] | 1537 (M) | 1068 (S) |
| 3320 (S) | 1477 (S) | 1040 (S) |
| 3240 (S) | 1450 (S) | 1023 (S) |
| 3120 (S) | 1400 (M) | 967 (M) |
| 2920 (S) (oil) | 1363 (M) | 942 (M) |
| 2843 (S) (oil) | 1333 (M) | 923 (M) |
| 2720 (M) | 1293 (S) | 893 (M) |
| 2680 (M) | 1240 (M) | 850 (M) |
| 2650 (M) | 1177 (M) | 800 (M) |
| 2570 (M) | 1155 (M) | 770 (M) |
| 1673 (S) | 1130 (S) | 710 (M) (oil) |
| 1620 (S) | 1107 (S) | |
| 1600 (S) | 1083 (S) | |

[1] Band intensities are indicated as "S," "M," and "W," respectively, and are approximated in terms of the backgrounds in the vicinity of the bands. An "S" band is of the same order of intensity as the strongest band in the spectrum; "M" bands are between one-third and two-thirds as intense as the strongest band, and "W" bands are less than one-third as intense as the strongest band. These estimates are made on the basis of a percent transmission scale.

Titration:

$pKa'_1$, 3.00: $pKa'_2$, 9.61, in water
Mol. wt.=394

Figure 4:
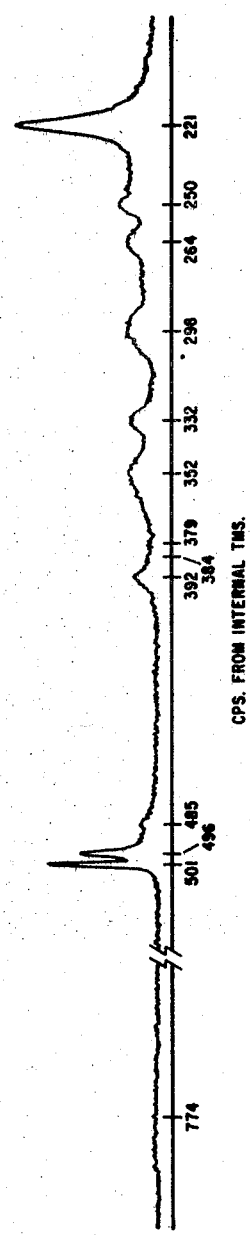

Other distinguishing characteristics:

Rotatory optical dispersion—positive at 310–589 m$\mu$
Nuclear magnetic resonance—
   Canarius has a characteristic NMR spectrum as shown in FIGURE 4 of the accompanying drawing. The NMR spectrum was observed on a Varian A–60 spectrometer on a solution (ca. 0.5 ml., ca. 0.3 molar) of the sample of canarius in deuterated chloroform. The spectrum was calibrated against internal tetramethylsilane and the precision of the $\Delta \nu$ was >±1 c.p.s. Frequencies were recorded in c.p.s. downfield from tetramethylsilane.

Figure 2:
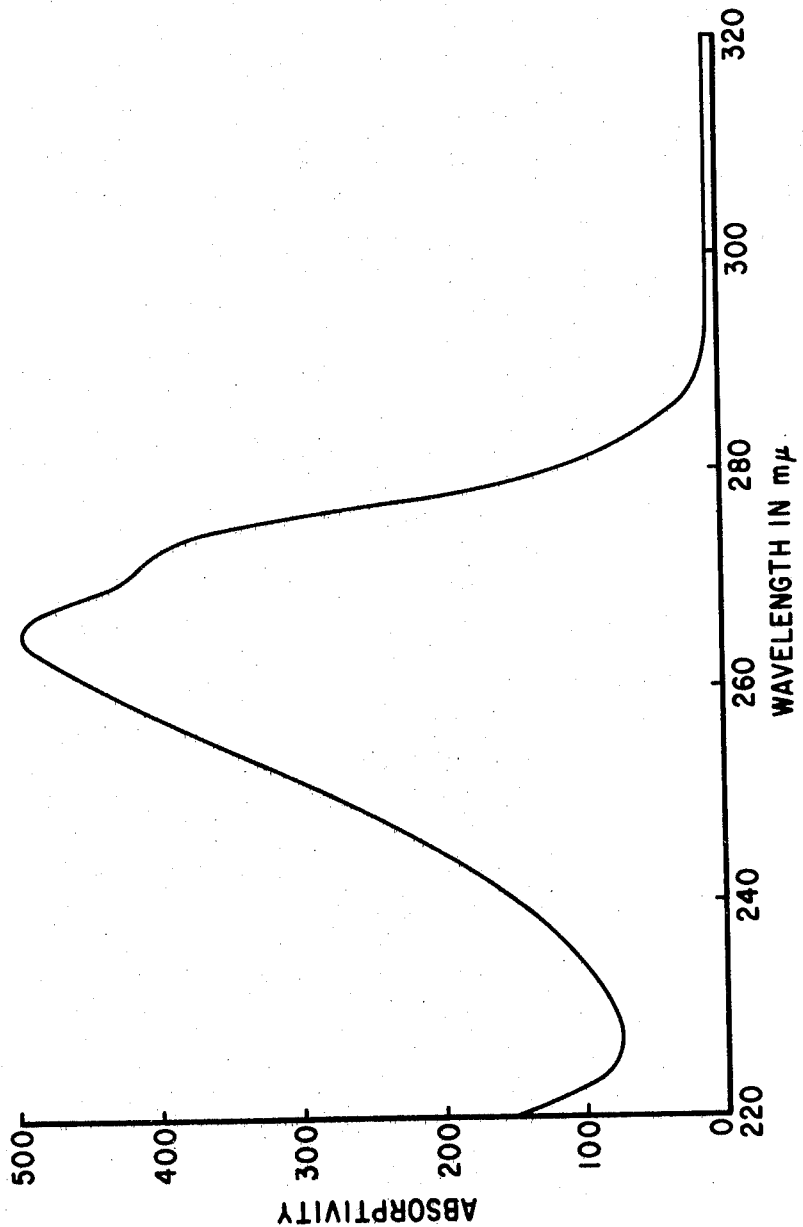
Figure 3:
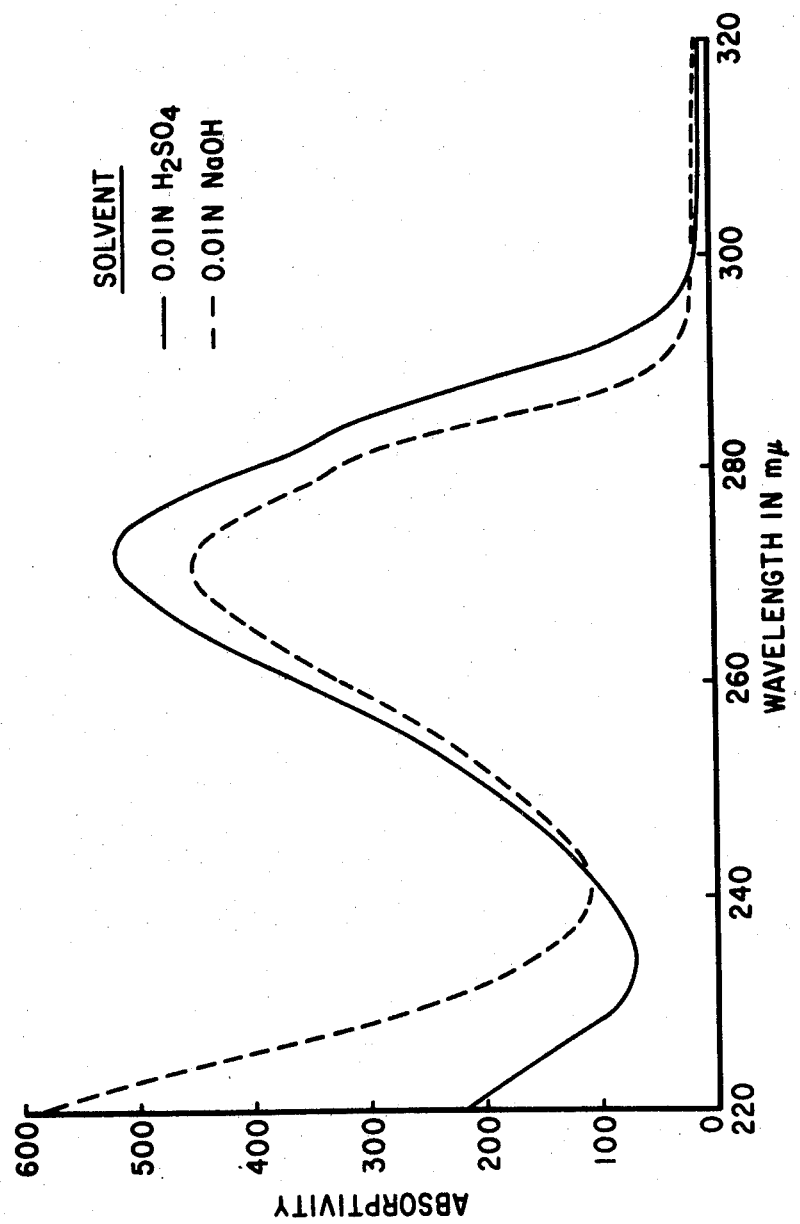

We claim:
1. A composition of matter assaying at least 1.5 mcg./mg. of canarius, a compound which
   (a) is effective in inhibiting the growth of vaccinia, Newcastle disease, influenza A, and Coe viruses, and
   (b) is effective in inhibiting the growth of various yeasts;
and in its essentially pure crystalline form
   (c) is soluble in water, dimethyl sulfoxide, and glacial acetic acid; and insoluble in butanol, higher alcohols, acetone and ethers;
   (d) has the following average elemental analysis:
      C=38.40%, H=4.94%, N=24.05%, O=31.85%
   (e) has a molecular weight of 394;
   (f) has a characteristic ultraviolet absorption maxima as follows:
      water max. at 264.5 m$\mu$, a=49.79
      0.01 N $H_2SO_4$ max. at 272 m$\mu$, a=50.34
      0.01 N NaOH max. at 271.5 m$\mu$, a=45.36
   and as shown in FIGURES 2 and 3 of the drawing;
   (g) has an optical rotation $[\alpha]_D^{25}$ +55.4 (c.=0.09% in water);
   (h) has a characteristic infrared absorption spectrum as shown in FIGURE 1 of the accompanying drawing, and
   (i) has a characteristic NMR spectrum as shown in FIGURE 4 of the accompanying drawing.

2. A compound, canarius, according to claim 1 in its essentially pure crystalline form.

3. A process which comprises cultivating *Streptomyces canarius* var. *canarius* in an aqueous nutrient medium under aerobic conditions until substantial activity is imparted to said medium by production of canarius.

4. A process which comprises cultivating *Streptomyces canarius* var. *canarius* in an aqueous nutrient medium containing a source of assimilable carbohydrate and assimilable nitrogen under aerobic conditions until substantial activity is imparted to said medium by production of canarius and isolating the canarius so produced.

5. A process according to claim 4 in which the isolation comprises contacting the medium with a surface-active adsorbent, eluting the adsorbent with an acidified water-miscible solvent for canarius and recovering canarius from the solvent extract.

6. A process according to claim 5 in which the recovery of the canarius from the solvent extract is accomplished by liquid-liquid extraction.

7. A compound as defined in claim 1, canarius, in its essentially pure form.

No references cited.

JULIAN S. LEVITT, *Primary Examiner.*